(12) United States Patent
Cvelbar et al.

(10) Patent No.: US 12,305,561 B2
(45) Date of Patent: May 20, 2025

(54) MIXING ASSEMBLY FOR AN AFTER TREATMENT UNIT OF AN EXHAUST SYSTEM OF A VEHICLE

(71) Applicant: FAURECIA INDIA PRIVATE LIMITED, Pune (IN)

(72) Inventors: Randall Cvelbar, Columbus, IN (US); Eduardo Alano, Columbus, IN (US); Amee Bhatt, Columbus, IN (US); Amaresh Rakkasagi, Karnataka (IN); Anthony Burnett, Freetown, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/483,725

(22) Filed: Sep. 23, 2021

(65) Prior Publication Data
US 2022/0090531 A1  Mar. 24, 2022

(30) Foreign Application Priority Data
Sep. 23, 2020 (IN) .............................. 202021021766

(51) Int. Cl.
| | |
|---|---|
| *F01N 3/28* | (2006.01) |
| *B01D 53/94* | (2006.01) |
| *B01F 23/213* | (2022.01) |
| *B01F 25/10* | (2022.01) |
| *F01N 3/20* | (2006.01) |

(52) U.S. Cl.
CPC ....... *F01N 3/2892* (2013.01); *B01D 53/9431* (2013.01); *B01F 23/2132* (2022.01); *B01F 25/10* (2022.01); *F01N 3/2066* (2013.01); *B01F 2215/0431* (2013.01); *F01N 2610/02* (2013.01); *F01N 2610/1453* (2013.01)

(58) Field of Classification Search
CPC .... F01N 3/2892; F01N 3/2066; F01N 3/2821; F01N 3/2053; F01N 13/082; F01N 2610/1453; F01N 2610/085; F01N 2610/02; F01N 2240/20; B01F 2215/0431; B01F 25/10; B01F 23/2132; B01D 53/9431
USPC ............................... 261/76; 60/324; 422/176
See application file for complete search history.

(56) References Cited

U.S. PATENT DOCUMENTS

| | | | |
|---|---|---|---|
| 2015/0044103 A1* | 2/2015 | Sampath | B01F 25/102 422/168 |
| 2015/0267596 A1* | 9/2015 | Tobben | F01N 13/14 60/274 |

(Continued)

FOREIGN PATENT DOCUMENTS

WO   WO-2020009694 A1 *   1/2020   ......... B01D 53/9431

*Primary Examiner* — Mark A Laurenzi
*Assistant Examiner* — Kelsey L Stanek
(74) *Attorney, Agent, or Firm* — Foley & Lardner LLP

(57) ABSTRACT

A mixing assembly for an after-treatment unit of an exhaust system of a vehicle. The mixing assembly includes a swirl component and a bowl. The swirl component has a doser opening on a top surface for the ingress of reductant fluid(s) such as urea. The swirl component has a frustoconical portion and a cylindrical portion. The bowl is extended from a bottom surface of the cylindrical portion. Both the frustoconical portion and cylindrical portion of the swirl component are stamped together or formed from a single sheet metal stamping process. The present mixing assembly can substantially reduce the deposit build-ups in the transition between the swirl component and the bowl.

18 Claims, 4 Drawing Sheets

(56) References Cited

U.S. PATENT DOCUMENTS

| | | | | |
|---|---|---|---|---|
| 2016/0184783 A1* | 6/2016 | Tyni | ...................... | B01F 25/103 |
| | | | | 422/168 |
| 2016/0265409 A1* | 9/2016 | Püschel | .................. | B01D 53/94 |
| 2018/0178171 A1* | 6/2018 | Tyni | ........................ | B01F 25/25 |
| 2021/0404367 A1* | 12/2021 | Alano | ................... | F01N 3/2066 |

\* cited by examiner

MIXING ASSEMBLY FOR AN AFTER TREATMENT UNIT OF AN EXHAUST SYSTEM OF A VEHICLE

TECHNICAL FIELD

The present invention relates to an exhaust system for an internal combustion engine. More specifically, the present invention relates to a mixing assembly for an after-treatment unit of an exhaust system of a vehicle.

BACKGROUND

An engine exhaust system routes exhaust gas from the engine and exhaust it into the environment. While exhausted to the environment, the system provides noise attenuation and after treatment of the exhaust gases so to prevent environmental pollution. Further, the flow distribution of the exhaust gas plays a vital role in the after-treatment of the exhaust gas to prevent the exhaust of toxic substances to the environment. A typical exhaust system may include an inlet pipe, an after-treatment unit, and an outlet.

The after-treatment unit may include a diesel oxidation catalyst (DOC), a diesel particulate filter (DPF), and a selective catalytic reduction (SCR) system. The SCR technology has been used to reduce nitrogen oxides present in the exhaust of combustion engines. Some of these systems are constructed using urea-based technology having a mixing assembly including a container for storing a reductant fluid (e.g., urea) and a delivery system for transmitting the reductant fluid from the container to the exhaust stream.

A typical mixing assembly may include a bowl and a swirl component. Usually, a transition formation occurs between the swirl component and the bowl. The transition between the swirl component and the bowl is susceptible to deposit build-ups and may lead to early failure of the mixing assembly and thereby substantially reducing the efficiency of the exhaust system.

Further, the bowl and the swirl component may be made by a casting process which is not economical and substantially increases the weight of the mixing assembly. The bowl in the mixing assembly has a deep bowl shape and requires an expensive multi-strike stamping process.

Therefore, there is a requirement of a mixing assembly for an after-treatment unit of an internal combustion engine that overcomes few or all drawbacks of the existing mixing assemblies.

SUMMARY

An object of the present invention is to provide a mixing assembly for an after-treatment unit inside the exhaust system.

Another object of the present invention is to provide a mixing assembly that can substantially reduce the deposit build-ups in the transition between the swirl component and the bowl.

Yet another object of the present invention is to provide a mixing assembly which is made of sheet metal stampings to replace the large casting which has the potential to reduce the deposit risk while also lowering the cost and weight of the mixing assembly.

Further object of the present invention is to provide a mixing assembly, which is made by a metal stamping process which substantially reduces the weight of the mixing assembly.

According to an aspect of the present invention, a mixing assembly for an after-treatment unit inside an exhaust system of a vehicle is provided. The mixing assembly may include a swirl component and a bowl. The mixing assembly has a doser opening on a top surface of the swirl component for the ingress of a reductant fluid. By way of non-limiting example, the reductant fluid may be urea and the like.

In an embodiment, the swirl component may have a frustoconical portion and a cylindrical portion. The swirl component is made of adjoining two sheets longitudinally to configure the frustoconical portion and the cylindrical portion. The two sheets are symmetric such that upon joining the sheets along the longitudinal axis configures the frustoconical portion and the cylindrical portion. Specifically, in an embodiment, the two portions of the swirl component may be stamped together or formed from a single sheet metal stamping. The cylindrical portion is integrally arranged below the frustoconical portion when the sheets are adjoined.

Further, the frustoconical portion may have a curved flange extending circumferentially along the surface of the swirl component. The curved flange is for deflecting the reductant fluids while mixing inside the mixing assembly. The curved flange may also be attached to the swirl component by sheet metal stamping.

Further, the bowl is shallow as compared to swirl component. The depth ratio of the swirl component to the bowl may be substantially in a range of 2.5:1 to 3:1. Specifically, the depth ratio of the swirl component to bowl is 2.8:1. Since the bowl is shallowly drawn from the swirl component, the deposit build-ups in the transition between the swirl component and the bowl can be substantially reduced. The reduced filling of the deposit build-up may eventually prolong the life of the mixing assembly. The frustoconical portion and the cylindrical portion of the swirl component are stamped together or formed from a single sheet metal stamping. The use of sheet metal stampings to replace the large casting has the potential to reduce the deposit risk while also lowering the cost of the mixing assembly.

BRIEF DESCRIPTION OF THE DRAWINGS

Other features and advantages of the invention will become apparent when reading the detailed description given below, purely by way of example and in a non-limitative manner, referring to the following figures.

DETAILED DESCRIPTION

An embodiment of this invention, illustrating its features, will now be described in detail. The words "comprising," "having," "containing," and "including," and other forms thereof, are intended to be equivalent in meaning and be open-ended in that an item or items following any one of these words is not meant to be an exhaustive listing of such item or items or meant to be limited to only the listed item or items.

The terms "first," "second," and the like, herein do not denote any order, quantity, or importance, but rather are used to distinguish one element from another, and the terms "an" and "a" herein do not denote a limitation of quantity, but rather denote the presence of at least one of the referenced item.

The disclosed embodiments are merely exemplary of the invention, which may be embodied in various forms.

The present invention relates to a mixing assembly for an after-treatment unit arranged inside an exhaust system of a vehicle. Preferably, the after-treatment unit of an exhaust system may include a diesel oxidation catalyst (DOC), a diesel particulate filter (DPF), and a selective catalytic reduction (SCR) system. The SCR technology has been used to reduce nitrogen oxides present in the exhaust of combustion engines. Some of these systems are constructed using urea-based technology having the mixing assembly including a container for storing a reductant fluid (e.g., urea) and a delivery system for transmitting the reductant fluid from the container to the exhaust stream.

A typical mixing assembly may include a bowl and a swirl component. Usually a transition formation occurs between the swirl component and the bowl. The transition between swirl components and the bowl is susceptible to deposit build-ups such as the combustion byproducts. These deposits may lead to early failure of the mixing assembly and thereby substantially reducing the efficiency of the after-treatment system.

Figure 1:
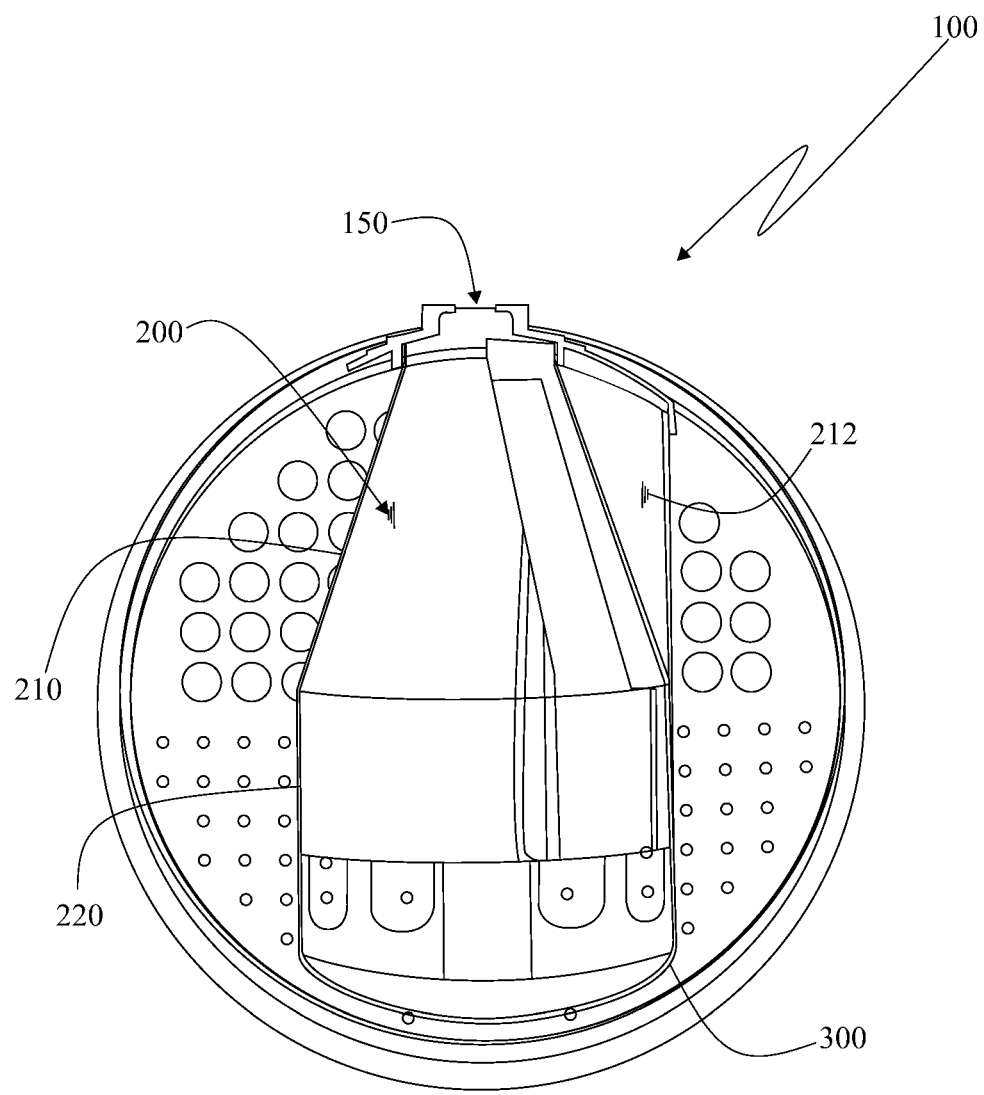
FIG. 1 illustrates a mixing assembly for an after-treatment unit inside an exhaust system of a vehicle in accordance with the present invention.
Figure 2:
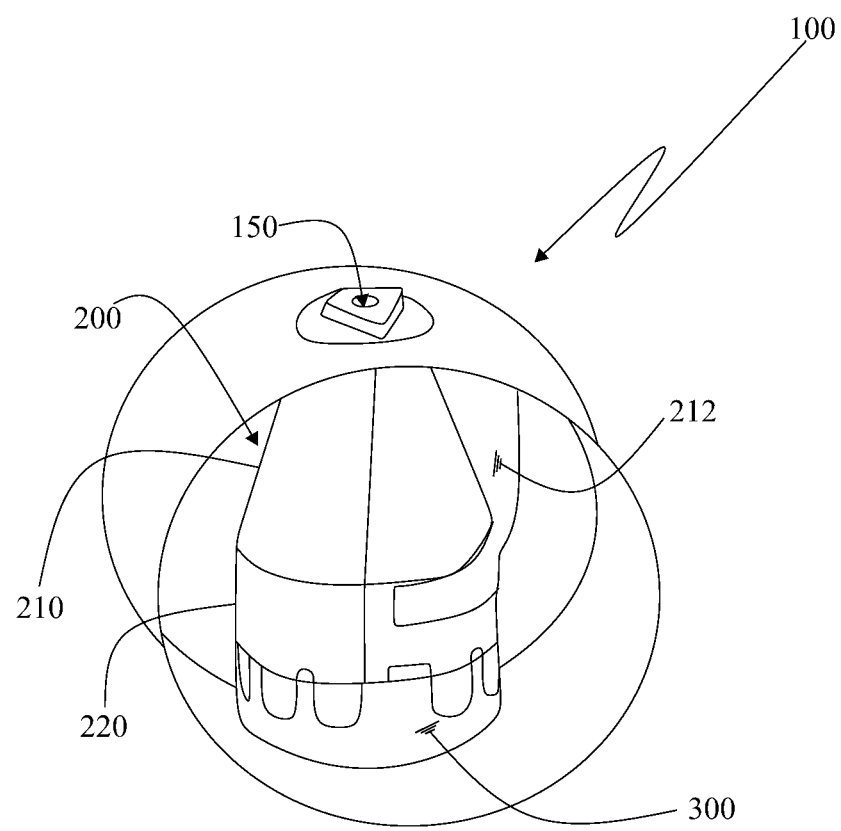
FIG. 2 illustrates a perspective view of FIG. 1.

Referring now to FIGS. 1 and 2, a mixing assembly (100) for an after-treatment unit (not shown) inside an exhaust system (not shown) of a vehicle in accordance with the present invention is illustrated. The mixing assembly (100) includes a swirl component (200) and a bowl (300). The mixing assembly (100) has a doser opening (150) on a top surface of the swirl component (200) for the ingress of a reductant fluid (not shown). Specifically, an upper portion of a frustoconical portion (210) has a doser mount (230) configured with the doser opening (150) for the ingress of the reductant fluid. By way of non-limiting example, the reductant fluid may be urea and the like. The reductant fluid may be stored in a container (not shown).

In the present embodiment, the swirl component (200) has the frustoconical portion (210) and a cylindrical portion (220) integrally constructed. The swirl component (200) is made of adjoining two longitudinally divided half portions of the frustoconical portion (210) and the cylindrical portion (220) longitudinally to configure the frustoconical portion (210) and the cylindrical portion (220). Adjoining the half portions along the longitudinal axis configures the frustoconical portion (210) and the cylindrical portion (220) as shown in FIG. 1. Specifically, the two portions that is the frustoconical portion (210) and the cylindrical portion (220) stamped together together or formed from a single sheet metal stamping. In the present embodiment, the cylindrical portion (220) is integrally arranged below the frustoconical portion (210).

Further, the frustoconical portion (210) has a curved flange (212) extending circumferentially along the surface of the swirl component (200). The curved flange (212), is guiding a portion of the exhaust flow inside the swirl (200) component. The curved flange (212) is also attached to the swirl component (200) by sheet metal stamping process.

Figure 3:
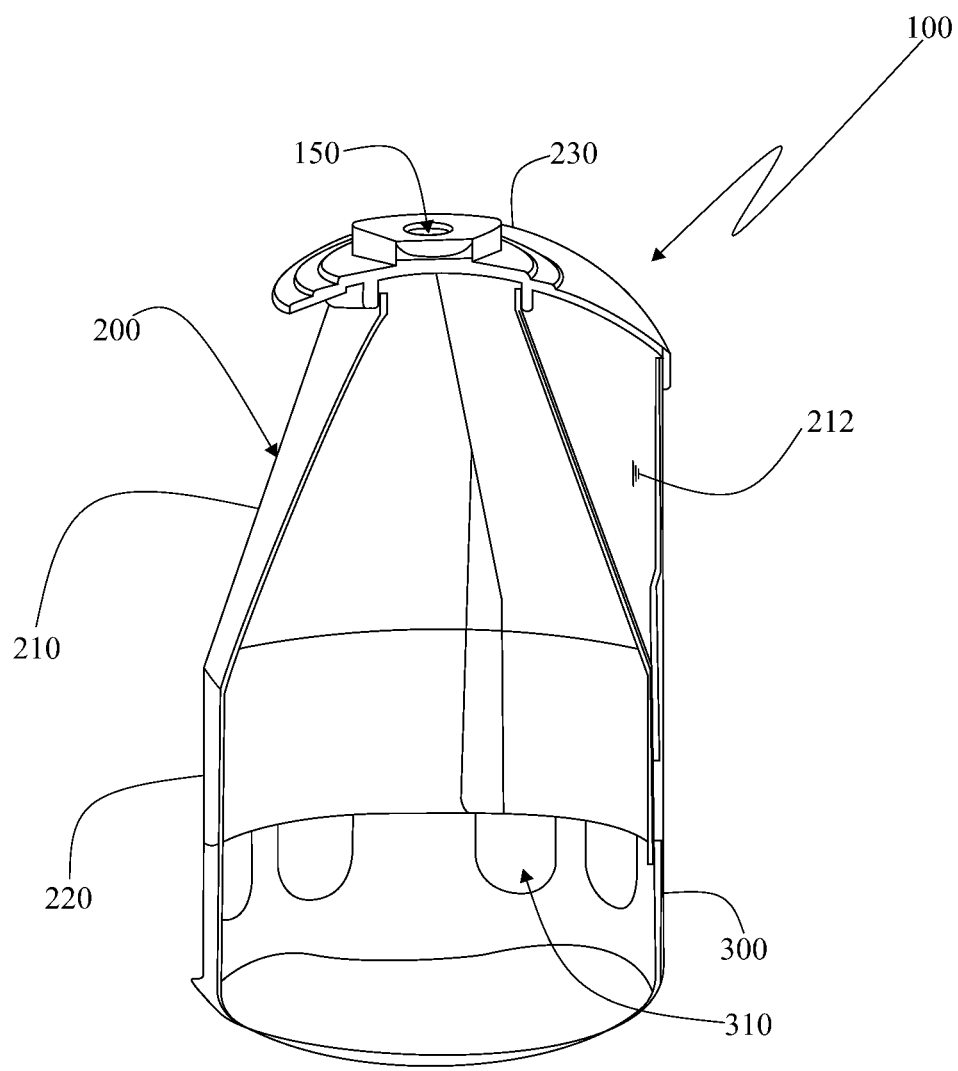
FIG. 3 illustrates a sectional view of the mixing assembly in accordance with the present invention.
Figure 4:
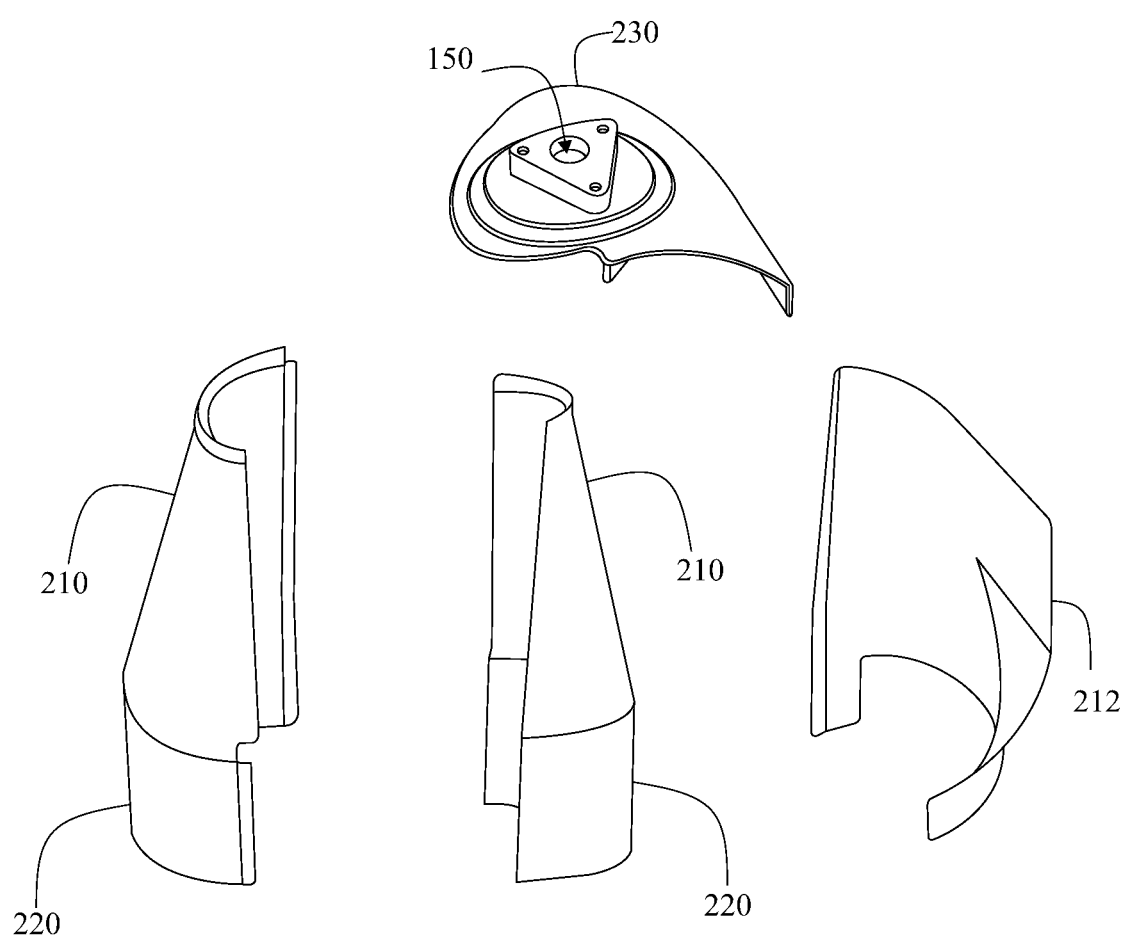
FIG. 4 illustrates an exploded view of a swirl component of the mixing assembly in accordance with the present invention.

Referring again to FIG. 1, the bowl (300) is shallowly drawn from a bottom surface of the cylindrical portion (220) of the swirl component (200). The depth ratio of the swirl component to bowl is in a range of 2.5:1 to 3:1. In the present embodiment, the depth ratio of the swirl component (200) to the bowl (300) is 2.8:1. Since the bowl (300) is shallowly drawn from the swirl component (200), the transition between the swirl component (200) and the bowl (300) is further away from the doser opening (150). This substantially reduces risks for deposit build-ups in the transition between the swirl component (200) and the bowl (300). The reduction of deposit build-up risk may eventually prolong the life of the mixing assembly (100). In order to further reduce deposit build-ups, spray impingement is carried out on the inner periphery of the swirl component (200) and the bowl (300) as shown in FIG. 3. The frustoconical portion (210) and the cylindrical portion (220) of the swirl component (200) are stamped together or formed by a single sheet metal stamping process. The use of sheet metal stamping process has the potential to reduce the deposit risk while also lowering the cost and weight of the mixing assembly (100). The bowl (300) has a plurality of outlet openings (310) for the mixing of the reductant fluid with the exhaust emission from the combustion chamber.

Therefore, the mixing assembly (100) for an after-treatment unit of the exhaust system can substantially reduce the deposit build-ups in the transition between the swirl component (200) and the bowl (300). The mixing assembly (100) is made of sheet metal stamping process to replace the large casting which has the potential to reduce the deposit risk while also lowering the cost of the mixing assembly (100). Further, the frustoconical portion (210) and the cylindrical portion (220) of the swirl component (200) are joined together by metal stamping process or formed by a single stamping process which substantially reduces the cost and weight of the mixing assembly (100).

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

We claim:

1. A mixing assembly for an aftertreatment unit of an exhaust system of a vehicle, the mixing assembly comprising:
   a swirl component with a doser opening on a top surface of the swirl component for ingress of a reductant fluid, the swirl component extending around an axis, the swirl component comprising:
      a frustoconical portion comprising a curved flange extending circumferentially along a side surface of the swirl component for guiding a portion of an exhaust flow inside the swirl component, the frustoconical portion having a first end and a second end, wherein a diameter of the second end is greater than a diameter of the first end, and
      a cylindrical portion contiguous with the second end, wherein a length of the cylindrical portion along the axis is less than a length of the frustoconical portion along the axis; and a bowl extending from a bottom surface of the cylindrical portion, the bowl extending around the axis, wherein a length of the bowl along the axis is less than the length of the frustoconical portion along the axis.

2. The mixing assembly of claim 1, wherein the bowl is shallow as compared to the swirl component.

3. The mixing assembly of claim 1, wherein a depth ratio of the swirl component to the bowl is in a range of 2.5:1 to 3:1, inclusive.

4. The mixing assembly of claim 3, wherein the cylindrical portion is integrally formed with the frustoconical portion and the bowl.

5. The mixing assembly of claim 1, wherein a depth ratio of the swirl component to the bowl is 2.8:1.

6. The mixing assembly of claim 5, wherein the bowl comprises a plurality of outlet openings.

7. The mixing assembly of claim 1, wherein the frustoconical portion and the cylindrical portion of the swirl component are stamped together or formed from a single sheet metal stamping process.

8. The mixing assembly of claim 1, wherein the cylindrical portion is integrally arranged below the frustoconical portion.

9. The mixing assembly of claim 1, wherein the reductant fluid is a urea.

10. The mixing assembly of claim 1, wherein the frustoconical portion diametrically expands from the top surface toward the cylindrical portion.

11. The mixing assembly of claim 10, wherein the frustoconical portion and the cylindrical portion of the swirl component are stamped together or formed from a single sheet metal stamping process.

12. The mixing assembly of claim 10, wherein the cylindrical portion is integrally formed with the frustoconical portion.

13. The mixing assembly of claim 1, wherein the bowl comprises a plurality of outlet openings.

14. The mixing assembly of claim 13, wherein the bowl comprises exactly one row of the outlet openings.

15. The mixing assembly of claim 1, wherein wherein a diameter of the bowl is equal to the diameter of the second end.

16. The mixing assembly of claim 1, wherein the cylindrical portion is integrally formed with the frustoconical portion.

17. The mixing assembly of claim 1, wherein at least a portion of the cylindrical portion is integrally formed with at least a portion of the frustoconical portion.

18. The mixing assembly of claim 1, wherein the bowl comprises a cylindrical bowl portion having the second diameter.

* * * * *